United States Patent [19]
Turetsky et al.

[11] 3,710,821
[45] Jan. 16, 1973

[54] NON-RETURN VALVE

[75] Inventors: Lazar Isaakovich Turetsky; Anatoly Grigorievich Gryzlov; Filipp Yakovlevich Proskurovsky; Gennady Nikolaevich Lomachenko; Nikolai Ivanovich Ageev, all of Moscow, U.S.S.R.

[73] Assignee: Vsesojuzny Teplotekhnichesky Nauchno-Issledovatelsky Institut imeni F.E. Dzerzhinskogo, Moscow, U.S.S.R.

[22] Filed: Feb. 12, 1970

[21] Appl. No.: 10,783

[52] U.S. Cl. ........ 137/527.8, 137/516.29, 137/527.6
[51] Int. Cl. .................................................. F16k 17/12
[58] Field of Search...137/516.29, 527, 527.8, 527.2, 137/527.4, 527.6; 251/334, 298

[56] References Cited

UNITED STATES PATENTS

| 396,765 | 1/1889 | Power | 137/527.8 X |
|---|---|---|---|
| 1,294,003 | 2/1919 | Weaver | 137/527.8 X |
| 1,510,033 | 9/1924 | Bold | 137/527.6 |
| 2,981,282 | 4/1961 | Mack | 137/516.29 |
| 3,075,547 | 1/1963 | Scaramucci | 137/516.29 |
| 3,318,327 | 5/1967 | Himes et al | 137/527.8 |

FOREIGN PATENTS OR APPLICATIONS

| 48,279 | 6/1966 | Germany | 137/527.8 |
| 1,157,873 | 11/1963 | Germany | 137/527.8 |

Primary Examiner—Samuel B. Rothberg
Assistant Examiner—David J. Zobkiw
Attorney—Waters, Roditi, Schwartz & Nissen

[57] ABSTRACT

A non-return valve whose closing element is made in the form of a flat disc, has a sealing element of an elastic material on the periphery and is mounted on one end of a two-arm lever whose other end carries a counterweight. Said sealing element is made in the form of a cup whose working part is shaped as a truncated cone standing out above the surface of said disc and is directed by the larger base towards the body of said valve.

1 Claim, 4 Drawing Figures

NON-RETURN VALVE

The invention relates to non-return valves.

The valve according to the invention can be used most successfully in the ducts communicating the rooms with polluted atmosphere with the ventilating system to prevent the contaminants from escaping out of said rooms into the ambient atmosphere. Such rooms may be found, for example, in the buildings of atomic power stations.

In the known valves intended for the same application the closing element is made in the form of a disc secured to one end of a two-arm lever whose other end carries a counterweight. The lever is supported by a sliding or rolling contact bearing. The valve parts are arranged in such a way that the valve is open when the air moves from the ventilating system and closes when said system is inoperative or in case of a pressure rise in the contaminated room.

Inasmuch as pressure in the contaminated room may be equal to, or slightly above the atmospheric pressure when the ventilating system is inoperative, reliable sealing of the gap between the valve disc and its seat presents a serious problem when there is no pressure difference on the disc and it is necessary that the valve should open at a minimum overpressure beginning from a few millimeters of water column at the side of the non-contaminated room. As a rule, the known valves have a sealing element, e.g. an elastic gasket secured to the seat, with which the valve disc interacts. The tightness of the seal is achieved only by exerting relatively great forces for pressing the disc against this sealing element.

The support of the two-arm lever (sliding or rolling contact bearing in the known valves) renders satisfactory service provided it is clean and well lubricated.

It is clear that the bearing will rendered satisfactory service if it is periodically cleaned, lubricated or replaced. It must also be understood that if the valve is intended to prevent the penetration of radioactive medium, the above requirements are very difficult to meet.

An object of the present invention resides in eliminating the aforesaid disadvantages.

The object of the invention consists in providing a reliable sealing of the gap between the valve disc and seat in the absence of pressure difference on the disc. Still, the valve must open at a minimum overpressure on the side of the ventilating system and work for a comparatively long time unattended. This object is accomplished by providing the sealing element according to the invention, in the form of a cup secured to the valve disc. The working part of said cup is shaped as a truncated cone protruding above the disc surface and directed by the larger base towards the valve seat.

The cup does not interfere with the lowering of the valve disc on the seat because it is bent outwards, away from the disc. However, the sealing is reliable because under the action of the medium (which the valve cuts off) the edges of the gasket are shifted towards the center of the disc, thereby pressing the cup tightly against the valve seat.

In the preferable embodiment of the valve, according to the invention, the thickness of the working part of the cup in the longitudinal section diminishes from the smaller base of the cone to its larger base.

Such a design of the cup improves its sealing properties at a very small force applied to the valve disc.

To simplify the fastening of the cup to the valve disc, it is expedient that the shape of its non-working part should follow the shape of the disc periphery. This allows the cup to be tightly fitted on the disc. To keep the cup from displacing, in this case it is sufficient to provide the disc with a thrust shoulder against which the non-working part of the cup would bear.

High sealing properties of such a cup combined with small forces on the valve disc can be ensured provided the valve lever can also be moved with ease, i.e. provided the valve sensitivity is sufficiently high. For this purpose, according to the invention, the support of the two-arm lever on which the valve disc is mounted, is made in the form of pointed elements directed vertically upward and the lever is provided with one or more recesses by means of which it would be able to rest on said pointed elements.

A substantial advantage of the present invention resides in the dependable operation of the valve within the service life of the cup, without any supervision by the servicing personnel.

Now the the non-return valve according to the invention will be described by way of example with reference to the accompanying drawings in which.

Figure 1:
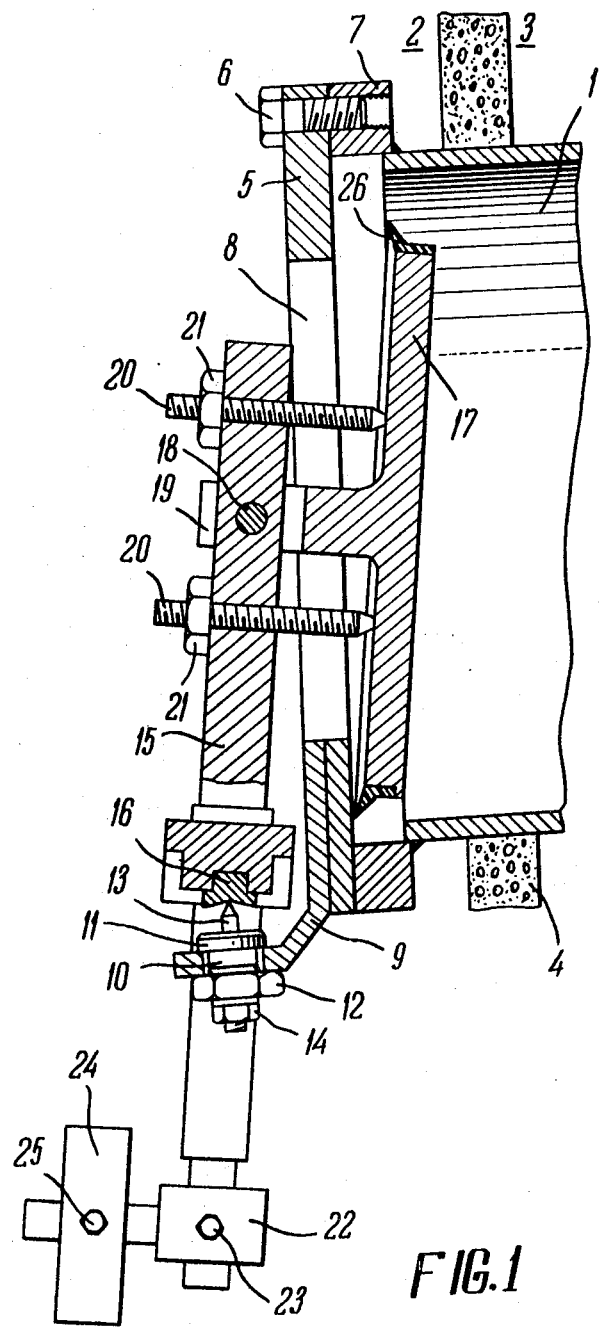
FIG. 1 shows the valve according to the invention, in the open position.

The non-return valve is installed in a ventilation duct 1 (FIGS. 1 and 2) which communicates a non-contaminated room 2 with a contaminated room 3, said rooms being separated by a partition 4. Then a pressure is built up in the room 2 which is somewhat higher than that in the room 3.

The valve body 5 is a ring secured by bolts 6 (one bolt is shown) to a flange 7 at the inlet of the ventilating duct 1. A portion of the surface of the body 5 at the side of the ventilating duct 1 near a hole 8 serves as the valve seat. Fastened by bolts (not shown) to the body 5 is a bracket 9 (FIGS. 1,2,3) which has two vertical holes. These holes accommodate bushings 10 installed with a certain clearance and provided with external and internal threads. The bushings rest on the bracket 9 by shoulders 11 and are fastened to said bracket by means of nuts 12. Pointed elements 13 are screwed into the bushings and secured to them by nuts 14. The elements 13 support a two-arm lever 15 by means of a pivot 16 pressed into a recess of this lever. The pivot 16 has a tapered recess for the interaction with the pointed element 13. A disc 17 is secured to the upper arm of the lever 15. The fastening consists of a cylindrical bar 18 whose ends are secured in a lug 19 located on the projection of the disc 17. To prevent the disc 17 against turning with relation to the bar 18, the lever 15 has two threaded holes one of which is above the opening in the lever under the bar 18 and the other one is located under said opening. These holes receive screws 20 whose ends bear against the disc 17. The screws 20 are secured in the lever 15 by nuts 21. The other end of the two-arm lever 15 carries a bracket 22 secured by a bolt 23 which allows this bracket to be shifted along said lever. The bracket mounts a counterweight 24 installed with the aid of a screw 25 which allows said counterweight to be shifted along said bracket in the direction normal to the longitudinal axis of the two-arm lever 15.

Figure 4:
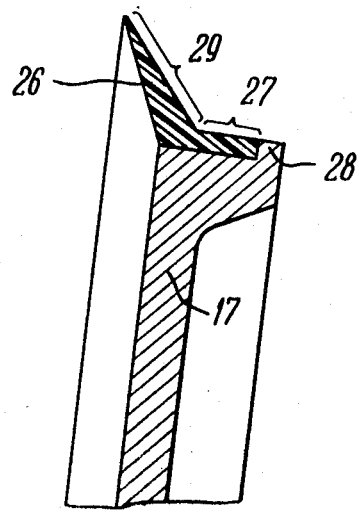
FIG. 4 is an enlarged view of the valve parts that is, a portion of the valve disc and cup.

On the periphery of the disc 17 there is a sealing element in the form of a cup 26. The non-working cylindrical part 27 (FIG. 4) of the cup bears against the shoulder 28 of the disc 17. The working part 29 of the cup 26 is shaped as a truncated cone standing out above the disc surface and directed by the larger base towards the valve seat (to the body 5). To improve the quality of sealing the working part 29 of the cup is gradually thinned out in the longitudinal section from the smaller base of the cone to the larger one.

The requirements for the manufacturing accuracy of the valve parts are less exacting than in the known valves. This must be attributed to the fact that the disc 17 can be so installed with relation to the body 5 that it would be pressed tightly against the valve seat by the screws 20, pointed threaded elements 13 and bushings 10 which can be shifted in the corresponding holes of the bracket 9.

The valve is set to open and close under the effect of preset forces by shifting the bracket 22 along the lever 15 and moving the counterweight 24 along the bracket 22.

It must be understood that the pointed elements may be made not only as needles as shown in the drawings, but as prisms too. The valve disc may be connected with the two-arm lever by a spherical joint instead of a cylindrical one.

Other modifications and alterations within the spirit and the scope of the invention may also be utilized.

Positioning of the counterweight 24 beyond the longitudinal axis of the two-arm lever 15 passing through the turning axis of this lever creates a moment directed counter-clockwise. Thus, in absence of the pressure differential on the disc 17 the valve is closed. If the pressure of the medium in the contaminated room 3 is higher than it is in the room 2, the valve disc 17 is pressed even stronger against the seat.

Figure 2:
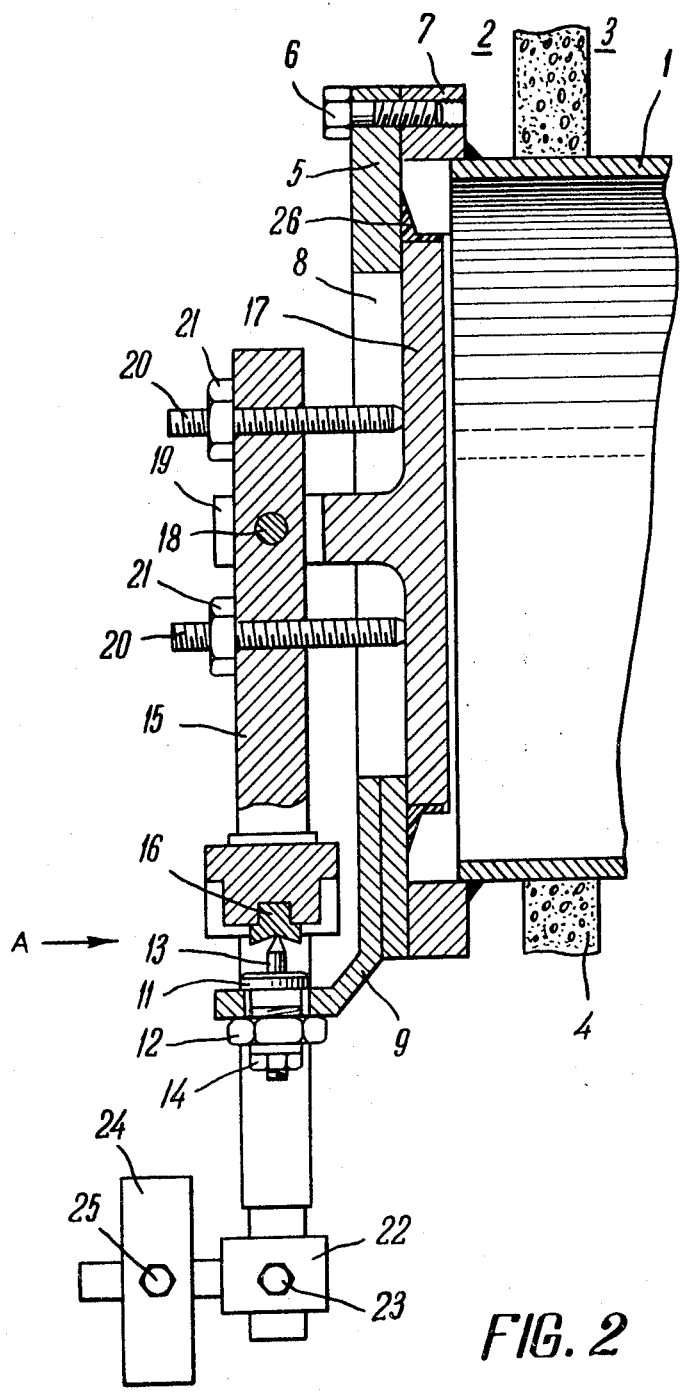
FIG. 2 is the same in the closed position.
Figure 3:
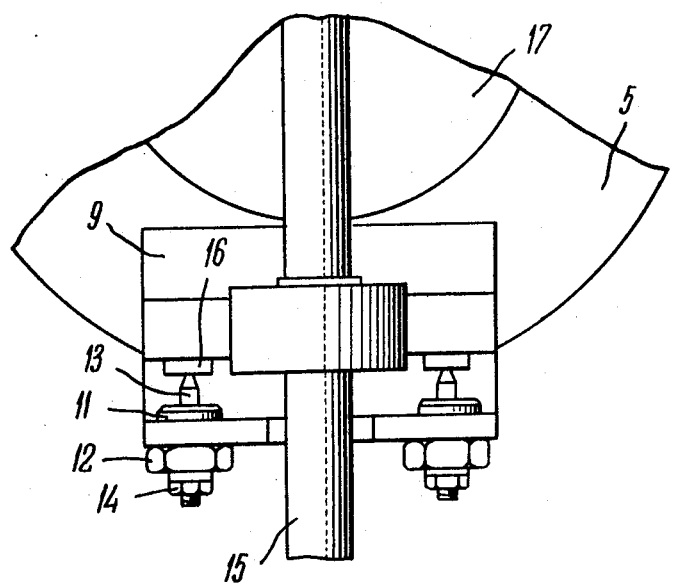
FIG. 3 is a view along arrow A of FIG. 2.

When the valve is closed, the working part 29 of the cup is bent outward from the disc. This is aided by the shape of the working part of the cup which is made gradually thinner from the smaller base of the cone towards its larger base. At the moment of complete closing of the valve, the disc 17 is pressed against the body 5, the working part 29 of the cup is deformed and takes the shape of a ring located parallel to the surface of the body 5 as shown in FIG. 2.

When the pressure in the contaminated room 3 drops below that in the room 2 or pressure in the room 2 rises higher than the pressure in the room 3, the disc 17 acted upon by the pressure difference overcomes the resistance of the counterweight, the lever 15 turns and the valve opens as shown in FIG. 1. The working part 29 of the cup 26 again takes the shape of a truncated cone.

What we claim is:

1. A non-return valve for gases and the like, comprising; a valve body with a hole for the passage of a flow of said gases; a valve seat formed by said valve body about said hole; a two-armed lever; bracket means mounted on said valve body extending toward said lever; upwardly extending pointed elements mounted on said bracket means and being vertically adjustable relative thereto; said lever being pivotally supported on said pointed elements; a plurality of pivoting elements secured to said two-armed lever, said pivoting elements each having a recess portion adapted to receive at least the pointed ends of said pointed elements and being of a configuration to permit a predetermined degree of pivoting motion between said lever and said valve body; a generally disc shaped valve closing element rigidly connected to one arm of said lever and adapted to coact with said valve seat; a resilient sealing cup installed on the periphery of said closing element, said cup having a working part shaped as a truncated cone extending radially outwardly of said closing element with the larger diameter base portion of said cone projecting axially towards said valve seat, and said cone having a cross-sectional thickness substantially decreasing toward said base portion; and a counterweight mounted on the other arm of said two-armed lever.

* * * * *